US009415549B2

(12) United States Patent
Mathon et al.

(10) Patent No.: US 9,415,549 B2
(45) Date of Patent: Aug. 16, 2016

(54) IMPREGNATION MANDREL WITH VACUUM LINER FOR MAKING A GAS TURBINE CASING MADE OF COMPOSITE MATERIAL

(71) Applicant: SNECMA, Paris (FR)

(72) Inventors: Richard Mathon, Brunoy (FR); Olivier Patrigeon, Nanterre (FR); Louis Bettega, Boucheporn (FR)

(73) Assignee: SNECMA, Paris (FR)

( * ) Notice: Subject to any disclaimer, the term of this patent is extended or adjusted under 35 U.S.C. 154(b) by 247 days.

(21) Appl. No.: 14/352,159

(22) PCT Filed: Oct. 17, 2012

(86) PCT No.: PCT/FR2012/052367
§ 371 (c)(1),
(2) Date: Apr. 16, 2014

(87) PCT Pub. No.: WO2013/060966
PCT Pub. Date: May 2, 2013

(65) Prior Publication Data
US 2014/0262046 A1 Sep. 18, 2014

Related U.S. Application Data

(60) Provisional application No. 61/551,544, filed on Oct. 26, 2011.

(51) Int. Cl.
*B29C 65/00* (2006.01)
*B32B 37/00* (2006.01)
(Continued)

(52) U.S. Cl.
CPC ............. *B29C 70/443* (2013.01); *B29C 33/30* (2013.01); *B29C 70/446* (2013.01);
(Continued)

(58) Field of Classification Search
CPC .... B29C 70/443; B29C 33/30; B29C 70/446; B29C 65/00; F01D 25/285; F02C 7/04; B32B 37/00
See application file for complete search history.

(56) References Cited

U.S. PATENT DOCUMENTS 5,145,621 A * 9/1992 Pratt ................. B29C 33/30
156/245
5,597,435 A 1/1997 Desautels et al.
(Continued)

FOREIGN PATENT DOCUMENTS

FR 2 879 497 6/2006
FR 2 958 875 10/2011
(Continued)

OTHER PUBLICATIONS

International Search Report issued Feb. 4, 2013, in PCT/FR12/052367 filed Oct. 17, 2012.

*Primary Examiner* — Michael N Orlando
*Assistant Examiner* — Matthew Hoover
(74) *Attorney, Agent, or Firm* — Oblon, McClelland, Maier & Neustadt, L.L.P

(57) ABSTRACT

An impregnation mandrel for production of a gas turbine casing made from composite material, including: a mandrel having a central wall and two side plates; compaction bars, each including (i) a wedge configured to bear against a fibrous reinforcing part covering angles formed between the central wall and the side plates of the mandrel, and (ii) an attachment flange configured to be attached to the corresponding side plate of the mandrel; a flexible casing forming a vacuum bag and configured to be applied at least against the fibrous reinforcing part covering the central wall of the mandrel; and a mechanism for injecting resin into a space defined between the vacuum bag and the mandrel at one of longitudinal ends of the fibrous reinforcement and for extracting the resin at the opposite end.

9 Claims, 3 Drawing Sheets

(51) Int. Cl.
  *B29C 70/44* (2006.01)
  *B29C 33/30* (2006.01)
  *F01D 25/28* (2006.01)
  *F02C 7/04* (2006.01)
  *B29L 31/00* (2006.01)
  *B29C 43/32* (2006.01)
  *B29C 43/36* (2006.01)

(52) U.S. Cl.
  CPC ............... *F01D 25/285* (2013.01); *F02C 7/04* (2013.01); *B29C 43/36* (2013.01); *B29C 2043/3205* (2013.01); *B29L 2031/7504* (2013.01); *F05D 2300/603* (2013.01); *Y02T 50/672* (2013.01)

(56) References Cited

U.S. PATENT DOCUMENTS

2006/0134251 A1* 6/2006 Blanton .................. B29C 33/48 425/110
2008/0128938 A1* 6/2008 Boutefeu .............. B29C 70/546 264/45.1

FOREIGN PATENT DOCUMENTS

GB  2 243 104  10/1991
WO  WO 2006/064167 A1  6/2006

\* cited by examiner

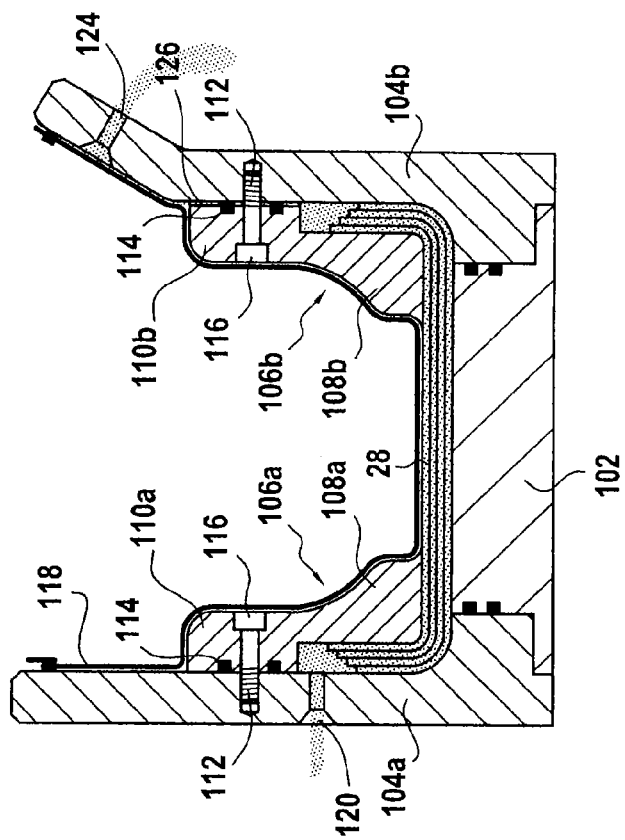
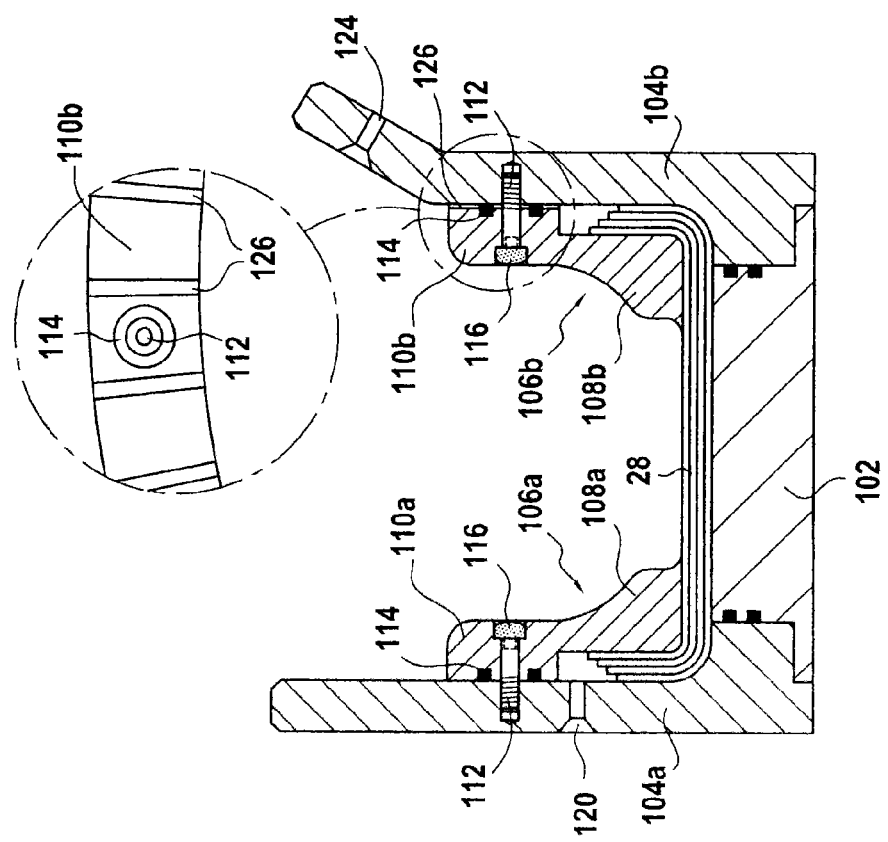
FIG.3
FIG.4

IMPREGNATION MANDREL WITH VACUUM LINER FOR MAKING A GAS TURBINE CASING MADE OF COMPOSITE MATERIAL

BACKGROUND OF THE INVENTION

The present invention relates to the general field of gas turbine casings, and more particularly holding casings of gas turbine fans for aeronautical engines.

In a gas turbine aeronautical engine, a fan casing fulfils a number of functions. It defines the incoming air stream to the engine, supports abradable material with respect to the tip of the fan vanes, supports an optional structure for sound wave absorption for acoustic inlet treatment of the engine and incorporates or supports a holding shield. The latter comprises a trap for catching debris such as ingested items or fragments of damaged vanes thrown out by centrifuge action to prevent them from passing through the casing and reaching other parts of the aircraft.

Making a casing for holding a fan made of composite material has already been proposed. Reference could be made to document EP 1 961 923 which describes the production of a casing made of composite material of evolutive thickness, comprising the formation of a fibrous reinforcement by superposed layers of a fibrous texture and densification of the fibrous reinforcement by a matrix. According to this invention, the fibrous texture is made by three-dimensional weaving with evolutive thickness and is wound in several superposed layers onto a mandrel having a central wall of profile corresponding to that of the casing to be manufactured and two lateral flanges of profile corresponding to those of the external flanges of the casing. The resulting fibrous preform is held on the mandrel and impregnation by resin is completed under vacuum prior to polymerisation. The winding on a mandrel of a woven texture of evolutive thickness as described in this document directly gives a tubular preform having the preferred profile with variable thickness.

In practice, the resin impregnation step conducted under vacuum requires a supple envelope (or liner) to be applied to all the fibrous reinforcement, and especially at the level of the flanges of the reinforcement which will later form the external flanges of the casing. A difference in pressure is then set between the exterior and the space delimited by the mandrel and the liner containing the fibrous reinforcement. The injection of resin into this space can then start.

During this step, it was noted that setting the vacuum tends to generate tension in the layers of fibrous texture positioned at the level of the angles of flanges between the flanges and the central wall of the mandrel, this tension setting causing the fabrics to unstick at the origin of resin compaction and mass defects between the layers.

AIM AND SUMMARY OF THE INVENTION

The main aim of the present invention is therefore to rectify such drawbacks by proposing a solution for impregnation by vacuum liner ensuring uniform compaction of the fibrous reinforcement, especially at the level of the angles of flanges.

This aim is attained by an impregnation mandrel for making a gas turbine casing made of composite material, comprising:
an impregnation mandrel on which is intended to be held a fibrous reinforcement formed by superposed layers of a fibrous texture, the mandrel comprising a central annular wall the profile of which corresponds to that of the casing to be manufactured and two lateral flanges whereof the profiles correspond to those of external flanges of the casing to be manufactured;
compaction bars each comprising a corner intended to be supported against the part of the fibrous reinforcement covering the angles formed between the central wall and the flanges of the mandrel, and a coupling flange intended to be fixed on the corresponding flange of the mandrel;
a supple envelope forming a vacuum liner intended to be applied at least to that part of the fibrous reinforcement covering the central wall of the mandrel; and
means for injecting resin into a space delimited between the vacuum liner and the mandrel at a longitudinal end of the fibrous reinforcement and for extracting it at an opposite end.

The compaction bars of the mandrel according to the invention are positioned once the winding operation is completed and before placing of the vacuum liner. These compaction bars ensure uniform compaction of the part of the fibrous reinforcement covering the angles of flanges prior to setting the vacuum. In this way, any risk of formation of resin mass between the layers of the fibrous reinforcement during this operation for setting the vacuum can be prevented.

Also, the compaction bars are intended to be fixed directly on the impregnation mandrel, which properly and repeatedly controls the geometry of the external flanges of the casing to be manufactured.

The mandrel preferably comprises at least one resin injection orifice terminating inside the space delimited between the vacuum liner and the mandrel at a longitudinal end of the fibrous reinforcement, and at least one resin extraction orifice placed at the longitudinal end of the fibrous reinforcement opposite to where the resin injection orifice terminates.

In this case, the resin injection orifice can be formed in one of the flanges of the mandrel and the resin extraction orifice can be formed in the other flange. Advantageously, the resin injection orifice terminates at the corner of a so-called injection compaction bar, whereas the resin extraction orifice terminates downstream of the so-called extraction opposite compaction bars.

The coupling flanges of the extraction compaction bars may comprise grooves ensuring passage of the resin.

The vacuum liner can be intended to be also applied to the compaction bars and be fixed tightly by its free ends to the flanges of the mandrel.

The coupling flanges of the compaction bars are preferably intended to be fixed tightly on the flanges of the mandrel.

For each flange of the mandrel, there can be four compaction bars and they can be put end to end angularly to cover the total circumference of the mandrel.

Another aim of the invention is a winding machine of a fibrous texture on an impregnation mandrel, comprising a take-up mandrel on which a fibrous texture is intended to be stored, produced by three-dimensional weaving, the take-up mandrel having a substantially horizontal axis of rotation, an impregnation mandrel such as defined previously, the impregnation mandrel having a substantially horizontal axis of rotation parallel to the axis of rotation of the take-up mandrel, electric motors for driving the mandrels in rotation about their respective axis of rotation, and a control unit of the electric motors for driving the mandrels in rotation.

BRIEF DESCRIPTION OF THE DIAGRAMS

Other characteristics and advantages of the present invention will emerge from the following description, in reference to the attached diagrams which illustrate an embodiment devoid of any limiting character, in which:

FIG. 3 is a sectional view along of FIG. 2; and

FIG. 4 is a sectional view of the impregnation mandrel of FIG. 3 after placing of the vacuum liner.

DETAILED DESCRIPTION OF THE INVENTION

The invention will now be described within the scope of its application to the production of a fan casing in an aeronautical engine with a gas turbine.

An example of a manufacturing process of such a fan casing is described in document EP 1 961 923 which can be referred to.

The casing is made of composite material with fibrous reinforcement densified by a matrix. The reinforcement is made of fibres such as carbon, glass, aramide or ceramic and the matrix is made of polymer, for example epoxide, bismaleimide or polyimide.

Briefly, the manufacturing process described in this document consists of making a fibrous texture by three-dimensional weaving with chain take-up on a drum (hereinbelow called take-up mandrel) having a profile determined as a function of the profile of the casing to be manufactured.

The resulting fibrous texture is then transferred to the mandrel of a resin injection mould (hereinbelow called impregnation mandrel) the external profile of which corresponds to the internal profile of the casing to be manufactured.

While the preform is held on the impregnation mandrel, impregnation is then done with resin. For this purpose, a supple envelope (also called vacuum liner) is applied tightly to the preform and the resin is injected into the resulting mould. Impregnation is assisted by a difference in pressure being set between the exterior and the interior of the mould containing the preform (air vacuum). After impregnation, a resin polymerisation step is carried out.

Figure 1:
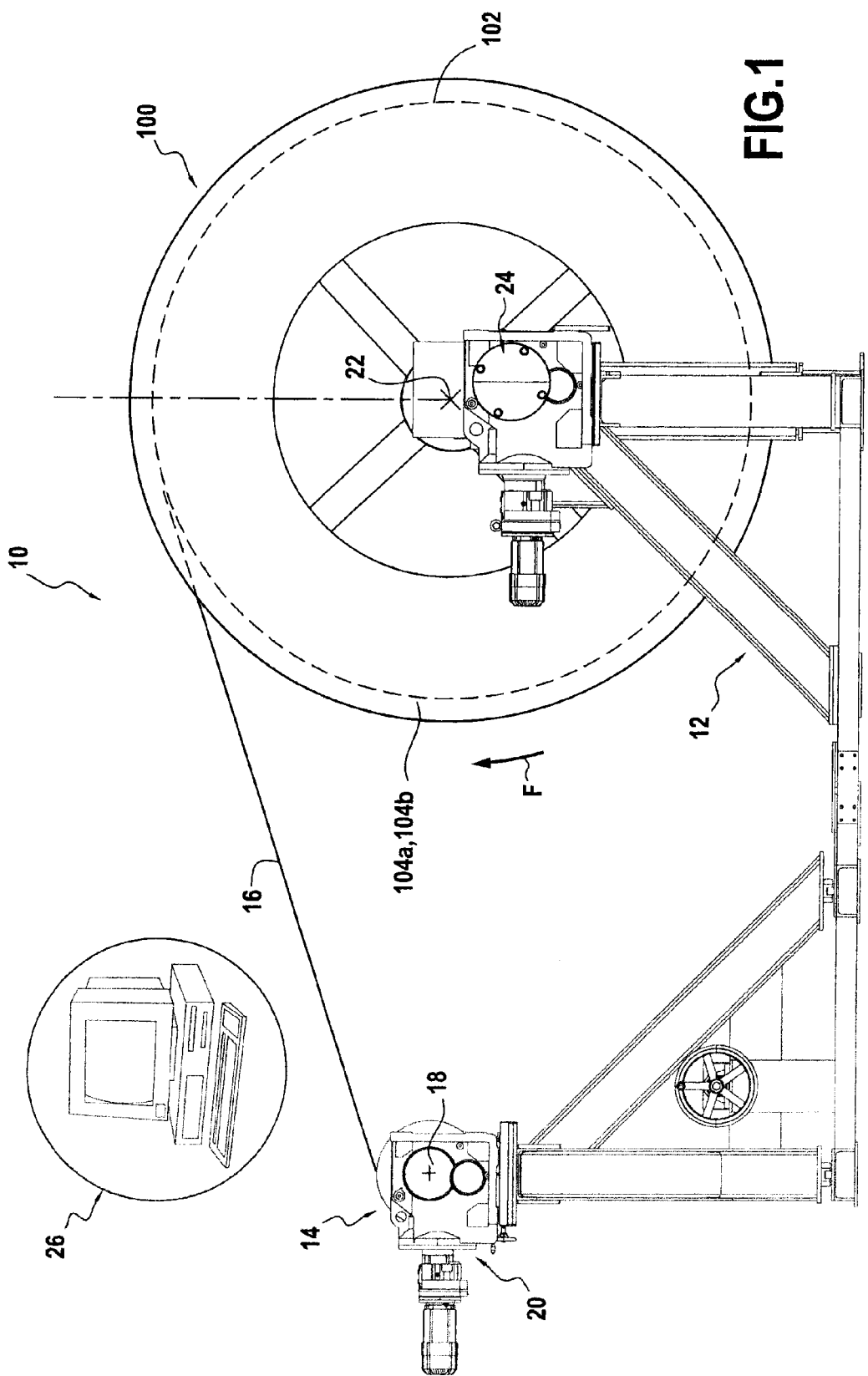
FIG. 1 is a schematic view and side elevation of a winding machine of a fibrous texture on an impregnation mandrel according to the invention.

The invention applies to any type of winding machine whereof the function is automated transfer of the fibrous texture stored on the take-up mandrel to the impregnation mandrel of the resin injection mould, such as shown in FIG. 1.

Reference could be made to patent application FR 11 53212 (not yet published) which describes in detail the structure and operation of such a machine.

Briefly, the winding machine 10 comprises a frame 12 supporting especially a take-up mandrel 14 and an impregnation mandrel 100 according to the invention. These mandrels are removable, that is, they can be dismantled from the frame.

The take-up mandrel 14 receives the fibrous texture 16 produced for example by three-dimensional weaving. It is borne by a horizontal axle 18 one end of which is mounted to rotate on the frame 12 of the winding machine and the other end is coupled to the output shaft of an electric engine 20, for example an electric motoreducer on alternating current.

The assembly constituted by the take-up mandrel 14, its axle 18 and its electric engine 20 can translate relative to the frame along the axis of rotation of the take-up mandrel. This degree of liberty in translation of the take-up mandrel creates alignment of this mandrel on the impregnation mandrel prior to winding of the fibrous texture on the impregnation mandrel.

The impregnation mandrel 100 of the winding machine is intended to receive the fibrous texture stored on the take-up mandrel, in superposed layers. In a way known per se, it has a central annular wall 102 whereof the profile of the external surface corresponds to that of the internal surface of the casing to be made and two lateral flanges 104a, 104b whereof the profiles correspond to those of the external flanges of the casing at its upstream and downstream ends to enable it to be mounted and linked to other elements.

The impregnation mandrel is borne by a horizontal axis 22 which is parallel to the axis of rotation 18 of the take-up mandrel and whereof one end is mounted to rotate on the frame 12 of the winding machine and the other end is coupled to the output shaft of an electric engine 24, for example an electric motoreducer on alternating current.

A control unit 26 is connected to the electric motors 20, 24 of the two mandrels and controls the rotation speed of each mandrel. More generally, this control unit controls the assembly of operating parameters of the winding machine, and especially the displacement in translation of the take-up mandrel when motorised.

With such a machine, winding of the fibrous texture on the impregnation mandrel is done as follows: the free end of the fibrous texture of the take-up mandrel is first fixed on the impregnation mandrel by means of a device for holding by clamping described hereinbelow, then the engines for driving the mandrels in rotation are activated and controlled by the control unit so as to apply adequate winding tension on the fibrous texture.

Winding of the fibrous texture in superposed layers on the impregnation mandrel can then start and be executed in the direction of rotation marked by arrow F in FIG. 1. By way of example, it might be necessary to effect 4 turns ⅛ to produce a fibrous reinforcement 28 having a thickness conforming to the specifications of the casing to be manufactured.

According to the invention, the impregnation mandrel 100 is provided with means ensuring impregnation by resin under vacuum liner on completion of the winding operation.

Figure 2:
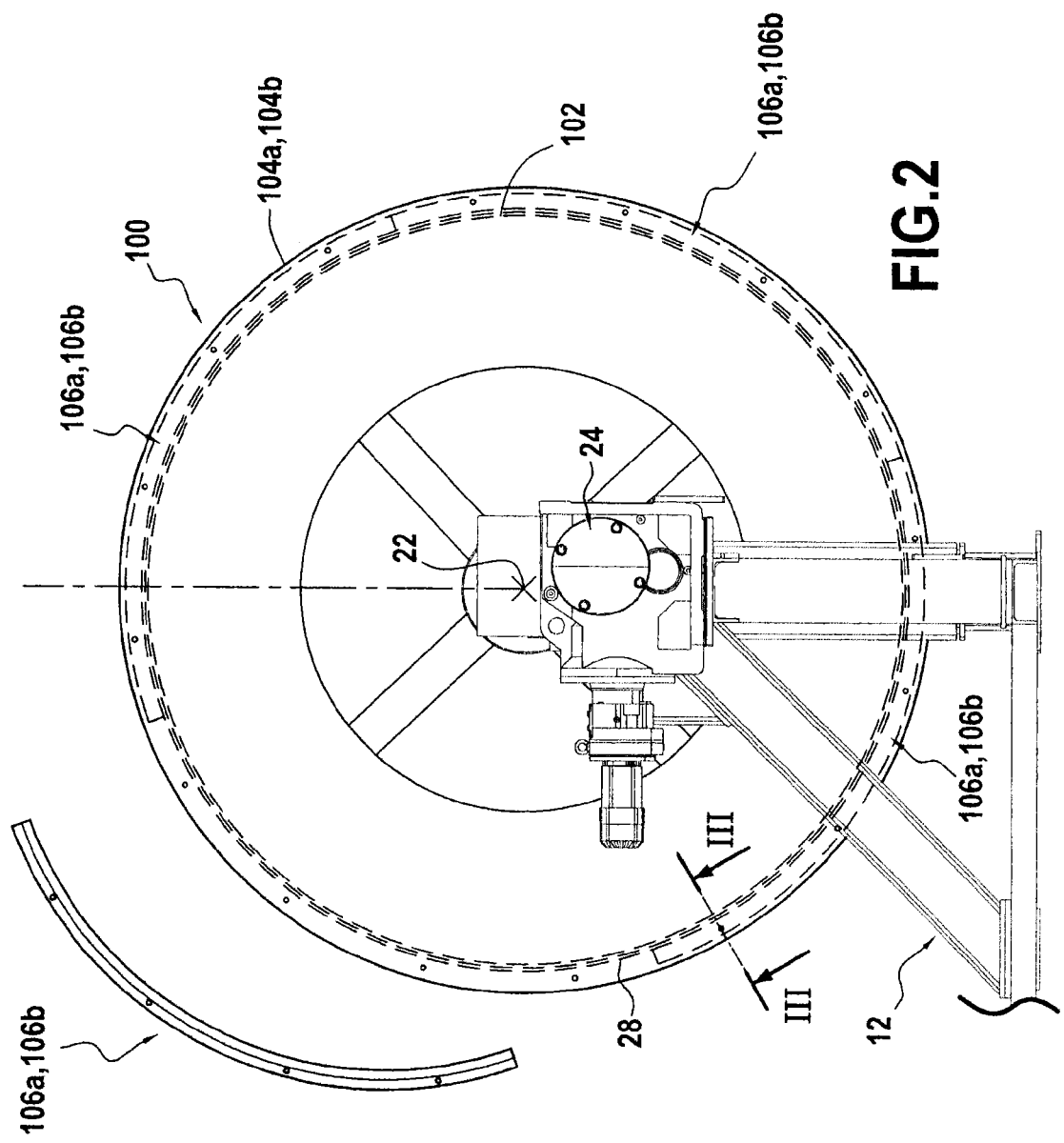
FIG. 2 is a view of the impregnation mandrel of the winding machine of FIG. 1 during placing of the compaction bars.

More precisely, as shown in FIGS. 2 to 4, the impregnation mandrel comprises so-called angular compaction bars which are intended to be positioned on the mandrel at the level of the parts of the fibrous reinforcement 28 covering the angles formed between the central wall 102 and the flanges 104a, 104b of the latter.

These bars comprise a first series of compaction bars 106a intended to be mounted against the part of the fibrous reinforcement covering the angle formed between the central wall of the mandrel and the flange 104a, and a second series of compaction bars 106b intended to be mounted against the part of the fibrous reinforcement covering the angle formed between the central wall of the mandrel and the other flange 104b.

The compaction bars 106a, 106b of these series cover the entire circumference of the mandrel and are sectored. So, in the example illustrated in FIG. 2, each series comprises four compaction bars each extending over 90° approximately and put end to end angularly to cover the total circumference of the impregnation mandrel. Of course, the number of bars per series could be different.

Each compaction bar 106a, 106b comprises a corner 108a, 108b which is intended to be supported against the part of the fibrous reinforcement covering the angles formed between the central wall 102 and the flanges 104a, 104b of the mandrel, and a coupling flange 110a, 110b intended to be fixed on the corresponding flange of the mandrel.

Placing the compaction bars on the impregnation mandrel ensures uniform compaction of the fibrous reinforcement at the level of the flange angles. This placing can be ensured by using a specific tool of tension type, for example.

Once in place, the compaction bars are fixed on the impregnation mandrel by means of their coupling flanges 110a, 110b and by means for example of screws 112. This fixing is made tight by the presence of O-ring joints 114 positioned against an internal face of the coupling flanges about the boreholes made for passage of screws and plugs 116 sealing the openings made in the coupling flanges for passage of these same screws.

A supple envelope 118 forming a vacuum liner is then applied to at least that part of the fibrous reinforcement covering the central wall of the mandrel. As shown in FIG. 4, this vacuum liner 118 is preferably applied at the same time to the fibrous reinforcement at the level of the central part of the mandrel, but also covers the compaction bars 106a, 106b, at the level of its free ends, to be fixed tightly on the flanges 104a, 104b of the mandrel. The material used to make the vacuum liner 118 is for example nylon (the choice of material will depend especially on the class of temperature of the resin).

The impregnation mandrel further comprises means for injecting resin into the resulting mould. For this purpose, one of the flanges of the mandrel (here the flange 104a) comprises at least one resin injection orifice 120 which terminates inside a space 122 delimited between the corner 108a of a corresponding compaction bar 106a (also called "injection compaction bar") and the corresponding flange 104a. In this way, the injection of resin is done at the level of one of the free ends of the fibrous reinforcement 28 held on the mandrel.

The resin is extracted at the level of the opposite flange (specifically here flange 104b). For this purpose, this flange comprises one or more extraction orifices 124 which terminate in a space delimited between the free end opposite the vacuum liner 118 and the flange 104b, this space being situated downstream of the corresponding compaction bars 106b (also called "extraction compaction bars"). Downstream here means relative to the flow of the resin between the two longitudinal ends of the fibrous reinforcement held on the mandrel.

To allow the resin to pass from the fibrous reinforcement 28 to the extraction orifice or the extraction orifices 124, it is necessary for it to get over the extraction compaction bars 106b. At the level of their internal face, the coupling flanges 110b of the latter also have a plurality of grooves 126 (see FIG. 3) extending radially outwards and dimensioned to allow such passage of resin.

Also, it is evident that the extraction orifice or the extraction orifices can be used to set up the vacuuming of the liner 118 by creating a difference in pressure between the exterior and the space delimited by the mandrel and the liner containing the fibrous reinforcement. For this purpose, it might be necessary to place vacuum drainage fabric between the vacuum liner and the flange 104b of the mandrel in its part downstream of the extraction compaction bars 106b (such fabric prevents discontinuity of the vacuum as far as the extraction orifices). Setting vacuum assists the resin injection operation.

Once the vacuum is set, the resin is injected into the mould formed by the impregnation mandrel covered by the vacuum liner. On completion of this operation, a resin polymerisation step is conducted as known per se.

The invention claimed is:

1. An impregnation mandrel for making a gas turbine casing made of composite material, comprising:

an impregnation mandrel on which a fibrous reinforcement is configured to be held, formed by superposed layers of a fibrous texture, the mandrel comprising a central annular wall with a profile that corresponds to that of the casing to be manufactured and two lateral flanges with profiles that correspond to those of external flanges of the casing to be manufactured;

compaction bars each comprising a corner configured to be supported against a part of the fibrous reinforcement covering angles formed between the central wall and the flanges of the mandrel, and a coupling flange configured to be fixed on the corresponding flange of the mandrel;

a supple envelope forming a vacuum liner configured to be applied at least on that part of the fibrous reinforcement covering the central wall of the mandrel; and means for injecting resin into a space delimited between the vacuum liner and the mandrel at a longitudinal end of the fibrous reinforcement and for extracting the resin at an opposite end.

2. The mandrel according to claim 1, further comprising at least one resin injection orifice terminating inside the delimited space between the vacuum liner and the mandrel at a longitudinal end of the fibrous reinforcement, and at least one resin extraction orifice placed at the longitudinal end of the fibrous reinforcement opposite to where the resin injection orifice terminates.

3. The mandrel according to claim 2, wherein the resin injection orifice is formed in a first of the flanges of the mandrel and the resin extraction orifice is formed in a second flange.

4. The mandrel according to in claim 3, wherein the resin injection orifice terminates at a corner of an injection compaction bar, whereas the resin extraction orifice terminates downstream of opposite extraction compaction bars.

5. The mandrel according to in claim 4, wherein the coupling flanges of the extraction compaction bars comprise grooves for passage of the resin.

6. The mandrel according to claim 1, wherein the vacuum liner is configured to be also applied to the compaction bars and be fixed tightly by its free ends to the flanges of the mandrel.

7. The mandrel according to claim 1, wherein the coupling flanges of the compaction bars are configured to be fixed tightly on the flanges of the mandrel.

8. The mandrel according to claim 1, wherein for each flange of the mandrel, there are four compaction bars that are put end to end angularly to cover a total circumference of the mandrel.

9. A winding machine of a fibrous texture on an impregnation mandrel, comprising:

a take-up mandrel on which a fibrous texture is configured to be stored, produced by three-dimensional weaving, the take-up mandrel having a substantially horizontal axis of rotation;

an impregnation mandrel according to claim 1, the impregnation mandrel having a substantially horizontal axis of rotation parallel to the axis of rotation of the take-up mandrel;

electric motors for driving the mandrels in rotation about their respective axis of rotation; and a control unit of the electric motors for driving the mandrels in rotation.

* * * * *